United States Patent
Chisu et al.

(10) Patent No.: US 10,750,561 B2
(45) Date of Patent: Aug. 18, 2020

(54) USER EQUIPMENT AND METHOD FOR INITIATING A RADIO LINK ABANDONMENT IN ADVANCE OF A RADIO LINK FAILURE

(71) Applicant: Motorola Mobility LLC, Chicago, IL (US)

(72) Inventors: Daniel Chisu, Franklin Park, IL (US); William Morgan, Wauconda, IL (US)

(73) Assignee: Motorola Mobility LLC, Chicago, IL (US)

(*) Notice: Subject to any disclaimer, the term of this patent is extended or adjusted under 35 U.S.C. 154(b) by 0 days.

(21) Appl. No.: 15/488,095

(22) Filed: Apr. 14, 2017

(65) Prior Publication Data
US 2018/0302934 A1 Oct. 18, 2018

(51) Int. Cl.
H04W 76/18 (2018.01)
H04W 76/19 (2018.01)
H04W 36/30 (2009.01)

(52) U.S. Cl.
CPC ........... H04W 76/18 (2018.02); H04W 76/19 (2018.02); *H04W 36/305* (2018.08)

(58) Field of Classification Search
CPC ............................ H04W 76/18; H04W 76/19
USPC ........................................................ 455/429
See application file for complete search history.

(56) References Cited

U.S. PATENT DOCUMENTS

| | | | |
|---|---|---|---|
| 2009/0052392 A1* | 2/2009 | Sumasu ................ | H04L 1/1887 370/331 |
| 2015/0201360 A1* | 7/2015 | Ray Chaudhuri .... | H04W 36/30 455/436 |
| 2016/0088127 A1* | 3/2016 | Cai ......................... | H04L 69/28 370/328 |
| 2016/0381610 A1* | 12/2016 | Pu ..................... | H04W 36/0055 455/436 |
| 2017/0359200 A1* | 12/2017 | Almalfouh ......... | H04L 25/0204 |

OTHER PUBLICATIONS

Klaus I. Pedersen, et al., Mobility Enhancements for LTE-Advanced Multilayer Networks with Inter-Site Carrier Aggregation, IEEE Communications Magazine, pp. 64-71, May 2013.

* cited by examiner

*Primary Examiner* — Joshua L Schwartz
(74) *Attorney, Agent, or Firm* — Loppnow & Chapa (57) ABSTRACT

The present invention provides a user equipment for use in a cellular network and a method for initiating a radio link abandonment in user equipment in advance of a radio link failure. The present invention includes establishing and maintaining a communication connection between the user equipment and a cellular network via a serving cell base station in support of a data flow via a radio link. The availability of other potential serving cell base stations including the availability of preferred potential serving cell base stations is then monitored. At least one of an uplink condition and a downlink condition of the data flow via the radio link are then monitored. Based upon the determined at least one of the uplink condition and the downlink condition, any impending degradation of the radio link is then predicted. When an impending degradation of the radio link is predicted, and a preferred potential serving cell base station is available, the radio link is abandoned prior to a radio link failure.

19 Claims, 5 Drawing Sheets

USER EQUIPMENT AND METHOD FOR INITIATING A RADIO LINK ABANDONMENT IN ADVANCE OF A RADIO LINK FAILURE

FIELD OF THE INVENTION

The present invention relates generally to managing the communication connection of a wireless communication device to the infrastructure of a wireless network, and more particularly, to initiating an abandonment of a current communication connection when the current connection is predicted to be stale and a preferred access point to the network is determined to be available.

BACKGROUND OF THE INVENTION

Personal wireless communications via mobile radio frequency devices, such as cellular radio frequency handsets, have been increasingly displacing personal communications via the traditional wired telephone system, often referred to as the plain old telephone service (POTS). The trend has been supported by the increased convenience of wireless communications, which has been made possible by the maturing of the wireless network, where at least the last link in the network, prior to the user, is wireless. A last link which is wireless, increasingly enables the user to be more mobile relative to the network. The increased mobility has at least in part been supported by the build out of the network, which has provided better coverage over more and larger geographical areas. More specifically, cellular base stations via which the mobile wireless devices can communicatively couple to the network, are constantly being added and/or updated, which in turn have been increasingly supporting enhanced network communication capabilities.

Generally, the cellular base stations are typically fixed geographically, and their corresponding positions are planned so as to each provide coverage in a particular area often referred to as a cell. The cells are often at least partially overlapping, in order that a device, which is exiting a first cell will have a period of time before exit, where the device is entering a new cell, and control of the communication can transition from the base station of the old cell to the base station of the new cell.

By cutting the cord to the network, devices that were previously fixed in place geographically, can now move about with a person as they transition between various locations, and attend to their various daily activities. As such, the devices are no longer primarily associated with a location, but are now generally associated with a particular individual.

However, mobility of the handsets requires that the position of the handsets be monitored relative to the various cellular base stations and their corresponding areas of coverage, so as to allow a device that is transitioning from one cellular coverage area to another cellular coverage area, to be able to better maintain a communication connection with the network as control of the communication connection is passed between the various associated base stations. Because there is an inherent delay in the ability of the network to transfer control between base stations and their corresponding coverage areas, it is often helpful to be able to anticipate the need for an upcoming transfer in order to properly prepare for and execute the transfer.

Unfortunately, there may be instances where not all transfers occur as smoothly as intended, and the possibility can exist where service in the current cell can degrade before the network can properly transition control of an existing communication connection to a new cell. In such an instance, this can result in the communication connection failing, and the connection possibly being ultimately dropped. It may then be necessary for the mobile device to attempt to establish a new connection in order to support further communications between the mobile wireless communication device and the network. The communication protocols often have a built in period of time while the communication connection between the mobile device and the network is compromised, before the current communication link has been deemed to have failed, and the connection is dropped. In instances, where the communication connection was supporting the transmission of data only, the delay associated with the dropping of a failed connection and the establishment of a new connection may not be so readily noticed. However, in instances where the communication connection was supporting a voice communication, the interruption and/or delay may be more noticeable, and correspondingly more unacceptable. In at least some instances, the determination that a radio link in support of a communication connection has failed is made in the network.

The present inventors have recognized that by being able to monitor the availability of other potential serving cell base stations and by being able to predict an impending degradation of the current radio link, it may be possible to initiate a radio link abandonment in the user equipment and/or mobile wireless communication device in advance of a radio link failure, which can help reduce the time before a communication connection can be re-established in support of a new radio link.

SUMMARY OF THE INVENTION

The present invention provides a method for initiating a radio link abandonment in user equipment in advance of a radio link failure. The method includes establishing and maintaining a communication connection between the user equipment and a cellular network via a serving cell base station in support of a data flow via a radio link. Availability of other potential serving cell base stations including the availability of preferred potential serving cell base stations is then monitored. At least one of an uplink condition and a downlink condition of the data flow via the radio link is then determined. Based upon the determined at least one of the uplink condition and the downlink condition, an impending degradation of the radio link is predicted. The radio link is then abandoned prior to a radio link failure, when an impending degradation of the radio link is predicted, and a preferred potential serving cell base station is available.

In at least some instances, the method further comprises after abandoning the radio link prior to a radio link failure, re-establishing and maintaining a communication connection between the user equipment and the cellular network via a new radio link associated with the preferred potential serving cell base station.

The present invention further provides a user equipment for use in a cellular network capable of initiating a radio link channel abandonment in advance of a radio link failure. The user equipment includes an antenna coupled to a transmitter and a receiver in support of establishing and maintaining a communication connection between the user equipment and a cellular network via a serving cell base station in support of a data flow via a radio link. The user equipment further includes a controller further adapted for establishing and maintaining a communication connection, where the controller includes a base station availability module adapted for monitoring availability of other potential serving cell base stations including the availability of preferred potential serving cell base stations. The controller further includes a condition determination module adapted for determining at least one of an uplink condition and a downlink condition of the data flow via the radio link. The controller still further includes a degradation prediction module adapted for predicting an impending degradation of the radio link, based upon the determined at least one of the uplink condition and the downlink condition. The controller still further includes a radio link abandonment module adapted for abandoning the radio link prior to a radio link failure, when an impending degradation of the radio link is predicted, and a preferred potential serving cell base station is available.

These and other objects, features, and advantages of this invention are evident from the following description of one or more preferred embodiments of this invention, with reference to the accompanying drawings.

DETAILED DESCRIPTION OF THE PREFERRED EMBODIMENT(S)

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

Figure 1:
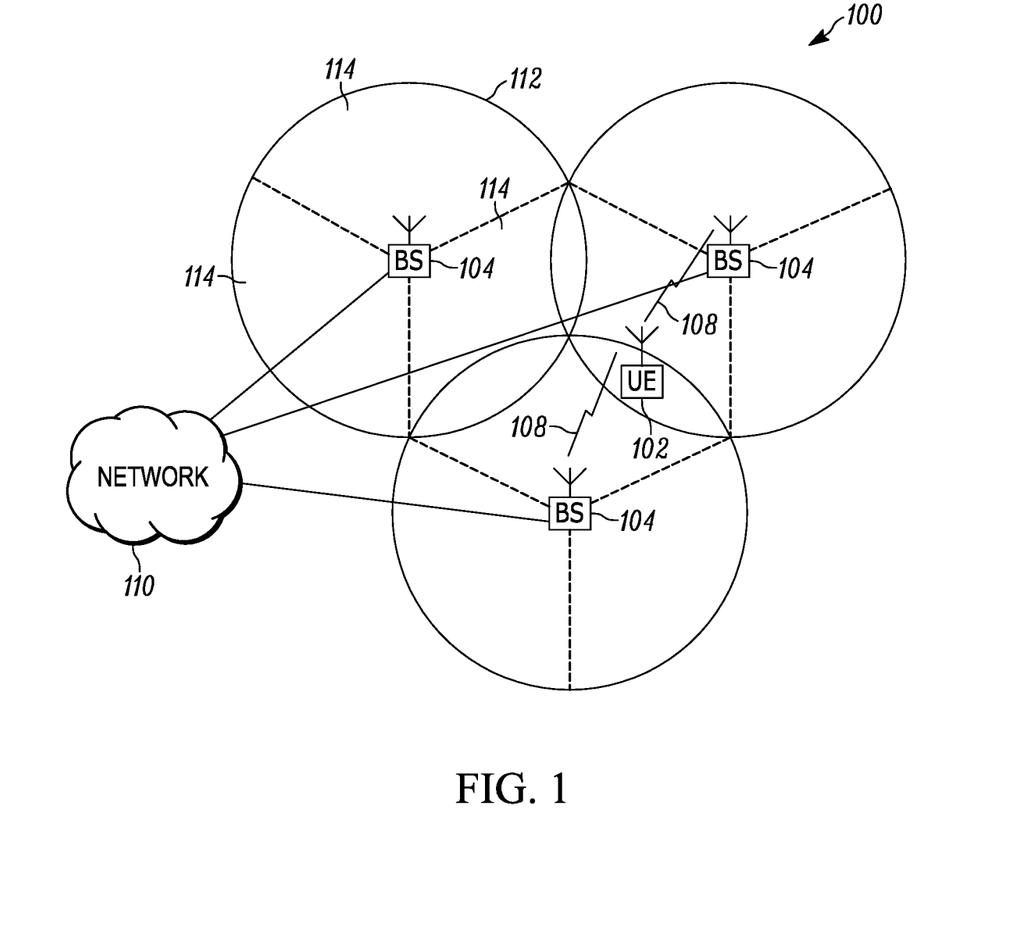
FIG. 1 is a block diagram of an exemplary communication network environment in which the present invention is adapted to operate.

FIG. 1 illustrates a block diagram of an exemplary communication network environment 100 in which the present invention is adapted to operate. The exemplary communication network environment 100 includes one or more wireless communication device 102, which are often referred to as user equipment. The one or more wireless communication devices 102, at least some of which may be mobile, can generally communicate within the network environment 100. The wireless communication devices 102 can be any suitable communication device, which is capable of establishing a wireless communication connection with another device.

In at least some embodiments, the one or more wireless communication devices 102 can each be a radio telephone, such as a cellular telephone. However one skilled in the art will appreciate that different ones of the wireless communication devices 102 could alternatively be representative of other types of devices, such as a personal digital assistant (PDA), a cordless telephone, a tablet, a netbook, a laptop or portable computer, a selective call receiver, a gaming device, a digital music storage and/or playback device, as well as any other form of mobile wireless communication device that might benefit from a communication connection within a network environment 100.

As the wireless communication devices 102 are positioned and/or move relative to one or more locations, the devices will generally attempt to establish and maintain a connection with the other device and/or the network 110. For example, the wireless communication devices 102 can establish and maintain a wireless communication connection with the network 110 via one or more base stations 104, which can be arranged to provide wireless communication coverage associated with respective cellular regions, some of which may at least partially overlap.

In most instances, the base stations 104 will be associated with network infrastructure, which can form part of the network 110, and which will enable the base stations 104 to communicate with still further communication devices. It is generally through the network infrastructure that one base station 104 will be able to communicate with another base station 104, which in turn will enable one wireless communication device 102 which is coupled to a particular base station 104 to communicate with another wireless communication device 102 which is coupled to a different base station 104.

In addition to base stations 104, wireless communication devices can also sometimes communicate wirelessly with a network 110 via wireless access point(s), or other type of wireless transceiver, which is communicatively coupled to the network 110. Within the network environment 100, the network 110 can include various public, private and personal networks, packet data and/or circuit switched networks, as well as various wide-area and local-area networks. The various communication connections between the different devices and/or network elements can additionally involve one or more different communication standards. At least a couple of examples of different communication standards include Global System for Mobile Communications (GSM) Code Division Multiple Access (CDMA), Orthogonal Frequency Division Multiple Access (OFDMA), Long Term Evolution (LTE), Global Positioning System (GPS), Bluetooth®, Wi-Fi (IEEE 802.11), Near Field Communication (NFC), Internet/Intranet (TCP/IP), Internet of Things (IOT), as well as various other communication standards. In addition, the mobile wireless communication device 102 may utilize a number of additional various forms of communication including systems and protocols that support a communication diversity scheme, as well as carrier aggregation and simultaneous voice and data signal propagation.

Base stations 104 will often be used to support communications within a more public wide-area cellular network environment, where wireless access points are at least sometimes associated with a more private local area network. Satellites can sometimes be used to provide a reference location in support of a global positioning system via which a device might be able to determine a current location. A location may also be determined and/or inferred, in connection with being within current communication range of a particular base station 104 and/or a wireless access point for which a location is known, and/or through the relative strength of the signals which are transmitted and received therebetween.

Each base station 104 has one or more general areas of coverage, which generally corresponds to a particular cell within which wireless communications 108 between the wireless communication device 102 and the base station 104 can be generally supported. Where the base station makes use of omni-directional antennas in support of a communication between itself and the one or more wireless communication devices 102, the base station 104 will be generally centrally located relative to the cell and the corresponding general area of coverage. The shape of the area of coverage in the illustrated embodiment is shown as generally being circular 112 in nature. Alternatively, where the base station makes use of directional antennas in support of wireless communications, the base station will generally be located at a vertex where multiple cellular regions can converge. For example, the directional antennas associated with a particular base station 104 may support several pie shaped regions 114, which extend from the base station 104 and correspondingly support multiple different cell areas in the overall geographical area within which wireless communications with a particular base station are being supported. In the particular example illustrated, dashed lines are used to highlight how an overall area of coverage for a particular base station 104 could be divided into multiple pie shaped regions 114. More specifically, the dashed lines are used to highlight the possibility of three pie shaped regions, each region 114 corresponding to a different set of directional antennas, which each transmit in a different direction having a breadth approximately corresponding to a 120 degree arc.

Generally, as a wireless communication device 102 moves relative to the one or more base stations 104, the detected relative strength of the communication signals conveyed between them will change. As the distance between a particular wireless communication device 102 and a particular base station 104 decreases, the detected relative strength of the communication signals between them will generally increase. Conversely, as the distance between a particular wireless communication device 102 and a particular base station 104 increases, the detected relative strength of the communication signals between them will generally decrease. By distributing various base stations 104 throughout an overall area of coverage, as a particular wireless communication device 102 moves away from a particular base station 104, ideally the wireless communication device 102 will be moving toward one or more other base stations 104. When the relative signal strength of a wireless communication connection with a particular base station 104 toward which the wireless communication device 102 is moving begins to meet or exceed the relative signal strength of the base station 104, which is currently supporting a wireless communication connection with the network 110, the network 110 can begin to consider the need to transfer control of the wireless communication connection to the base station 104 that the wireless communication device 102 is approaching. Such a transfer can sometimes be referred to as a handover or a handoff.

While generally the relative detected signal strength between a particular wireless communication device 102 and a particular base station 104 will change due to a change in the relative distance between the two, it is possible that the relative detected strength of a wireless communication connection can change without any change in the distance between the two. In any event, by monitoring the relative signal strengths between a particular wireless communication device 102 and multiple areas of coverage supported by the one or more base stations 104, the network 110 can better decide, which particular base station 104 through which the wireless communication device 102 should currently communicate with the network 110.

Ideally, the smooth operation of the network would allow the control of communication between the wireless communication device 102 and the network 110 to transition smoothly, as necessary, between the various base stations 104. However, there can be instances where a connection can degrade before a transition to a new base station 104 can be effectively managed. In such an instance, a connection may degrade to the point where the radio link will ultimately fail, even though there may be an available alternative base station 104 through which the communication connection could have been better maintained. In such an instance, when the wireless communication device 102 re-establishes a communication connection, it may be possible to establish support for the new communication connection through the better and/or preferred available alternative base station 104. While ultimately, the wireless communication device 102 may be now communicating with the network 110 through the preferred base station alternative, there can sometimes be a significant delay between the time that the radio link has been deemed by the network 110 to have failed, and the time that the new connection with the network 110 can be established. In such an instance, it may have been beneficial for the wireless communication device 102 to abandon the radio link in advance of the determination of a radio link failure, in order to more timely establish the new communication connection to the network 110 through the preferred base station alternative.

Figure 2:
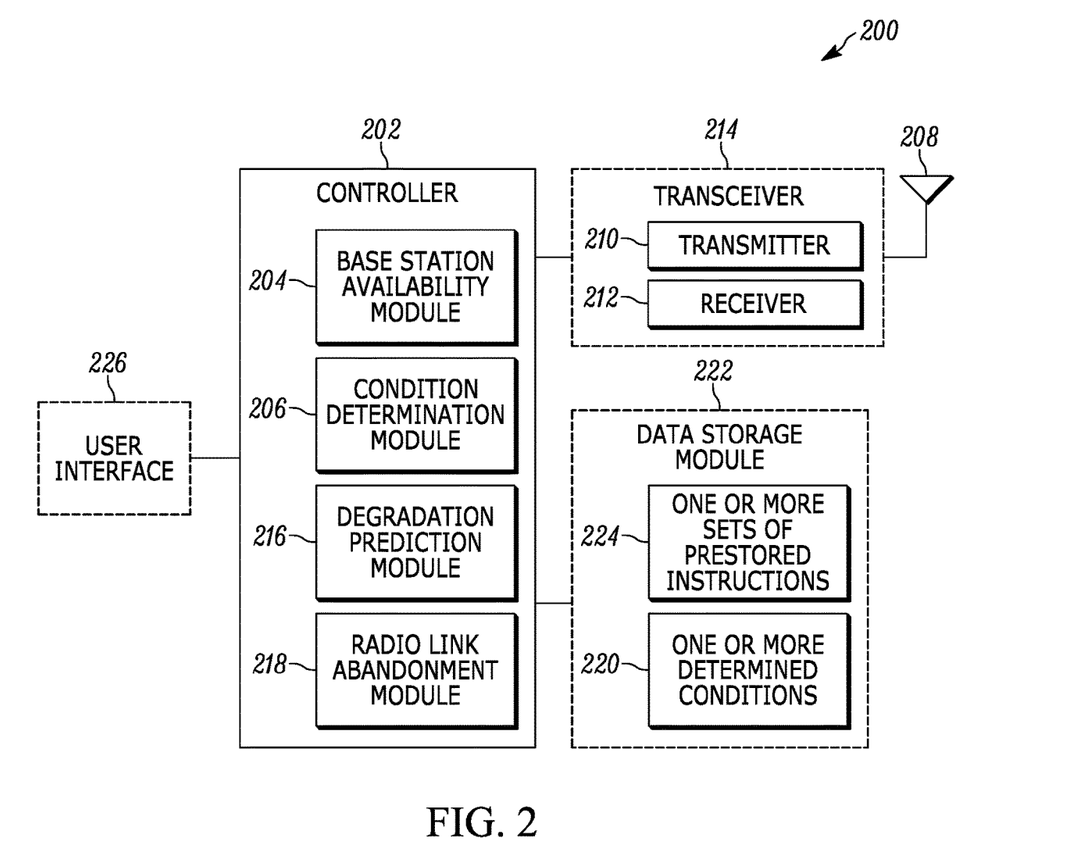
FIG. 2 is a block diagram of a user equipment for use in an exemplary network environment, in accordance with at least one embodiment.

FIG. 2 illustrates a block diagram 200 of a wireless communication device 102, also referred to as a user equipment, for use in an exemplary network environment 100, in accordance with at least one embodiment. In the illustrated embodiment, the wireless communication device 102 includes a controller 202 for establishing and maintaining a communication connection. As part of establishing and maintaining a communication connection, the controller 202 can help facilitate the initiation of a radio link abandonment in the wireless communication device 102 in advance of a radio link failure in the appropriate circumstances. In support of detecting the appropriate circumstances, the controller 202 includes a base station availability module 204, which monitors the availability of other potential serving cell base stations 104, as well as helps to determine their relative suitability in supporting any existing or future communications with and through the network 110. For example, the wireless communication device 102 can receive signals and messages through the network 110, including monitoring potential signaling received directly from the various base stations 104. For example, the network 110 might supply a message including a neighbor list, which help identify base stations 104 that the network 110 believes are well positioned relative to and/or are in the vicinity of the wireless communication device 102. Additionally or alternatively, the wireless communication device 102 could attempt to detect and acquire control signaling directly from the various base stations 104, that may be in communication range of the wireless communication device 102.

The controller 202 additionally includes a condition determination module 206, which is used to help determine the various uplink and downlink conditions of the data flow via the radio link. The various establishing, maintaining and monitoring of the signaling and corresponding communication connections with the network is facilitated through an antenna 208 coupled to the controller 202 through a transmitter 210 and a receiver 212, which in at least some instances can take the form of a transceiver 214.

The controller 202 still further includes a degradation prediction module 216, which can serve to help predict an impending degradation of an existing communication connection via the radio link, based upon the determined or detected uplink and downlink conditions. The controller 202 can then make the decision as to if and when it might be beneficial to abandon the radio link prior to any radio link failure, based upon any predicted impending degradation of the radio link, and the knowledge of an alternative serving cell base station 104 as being available, that is preferred and/or has the potential for producing a better option for coupling to the network 110. For example, in some instances a particular determined or detected condition could be compared with one or more predefined thresholds in determining the relative importance of the determined and/or detected condition. A radio link abandonment module 218, which is part of the controller 202, can be used to manage an abandonment of the radio link prior to a radio link failure, when such an abandonment is deemed suitable or appropriate.

The various determined or detected uplink and downlink conditions 220, in at least some instances, could be stored in a data storage module 222, which in turn could make them available to other portions of the controller 202 as part of their respective determinations and predictions.

Each of the modules of the controller 202 can be implemented in various combinations of hardware and/or software using one or more of discrete logic elements, state machines, gate arrays, processors, firmware, as well as one or more sets of pre-stored instructions 224, which could also be stored in the data storage module 222 for execution by one or more microprocessors that could be part of the controller 202. While the data storage module 222, is illustrated as being separate from the controller 202, it is possible that the controller 202 could have integrated data storage, which could be used to store all or some of the elements, which are presently being shown as being included as part of the separate data storage module 222.

In at least some instances, the wireless communication device 102 can include a user interface 226, which can support any interaction with the device 102 by a user. For example, in some instances, where the wireless communication device 102 is a cellular radio frequency telephone, the user interface 226 might include various displays, switches, speakers, microphones, transducers and sensors, through which a user can interact with the device. In some instances, an element of the device can include multiple functions. For example a display could additionally incorporate a touch sensitive interface, so as to allow both the transmission and receipt of information relative to the user. In still other instances, an element such as a transducer, could be used to produce a sound which can be audibly detected, as well as a vibration, that can be felt through the user's contact with the device 102. One skilled in the art will appreciate that the user interface 226 can incorporate and support still further types of user interactions without departing from the teachings of the present application.

In absence of an ability of the user equipment to initiate a radio link abandonment in advance of a radio link failure, in at least some instances, the degradation might be allowed to persist for a period of time that could be noticeable to the user, and during which time any ongoing communication of information including a voice communication could be noticeably negatively affected. For example, the network 110 may wait for several timers to expire before taking an action, that would allow the radio link to fail and a new connection to be established. In at least one instance, a wireless communication device 102 may be in a voice call, where real time protocol packets are being transmitted and received in support of the voice call. During the voice call the downlink may degrade, but the degradation may not be enough to trigger a radio link failure. During the corresponding degradation, a physical downlink shared channel decode may consistently fail, and the data flow may not be able to keep up with the real time protocol data stream.

At some point the device 102 may completely stop receiving real time protocol packets. The uplink may be power and grant-limited, and the physical uplink shared channel may retransmit discards. The device may not be able to handover to an available better neighbor (either no events are triggered or the measurement reports do not go through to the base station). This condition could persist for several seconds before the wireless communication device drops the physical uplink shared channel in favor of the physical random access channel. However at this point, the physical random access channel may also be continuously failing. Generally, the radio link failure will be triggered after a maximum number of random access channel failures are reached. This could similarly take an additional several seconds. Upon radio link failure, the device 102 may then attempt to re-establish a connection, which will generally occur on the more preferable neighbor base station which may be available. After the new connection is established, real time protocol packet flow on the downlink may then be allowed to resume.

Figure 3:
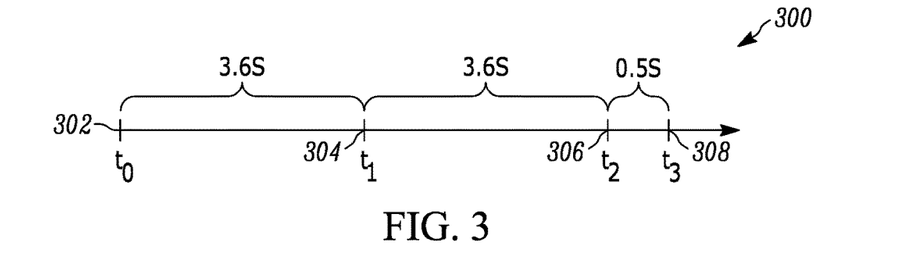
FIG. 3 is a timing diagram of one example of a radio link failure including the process during which a radio link failure is being determined, and the communication connection is being re-established.

FIG. 3 illustrates a timing diagram 300 of one example of a radio link failure including the process during which a radio link failure is being determined, and the communication connection is being re-established. In the illustrated embodiment, the time t0 represents the time 302 at which the communication device 102 stops receiving real time protocol packets. As noted above, this condition could exist for several seconds before the communication device 102 drops the physical uplink shared channel at t1 304. In the illustrated embodiment, this condition existed for a period of 3.6 seconds.

Upon dropping the physical uplink shared channel, failures can continue to occur on the physical random access channel for another several seconds (in the illustrated embodiment another 3.6 seconds) before the radio link failure is triggered at t2 306 after a maximum number of random access channel failures are reached. After a still further delay (0.5 seconds), during which a communication connection is re-established, the real time protocol packets may be able to resume at t3 308.

Figure 4:
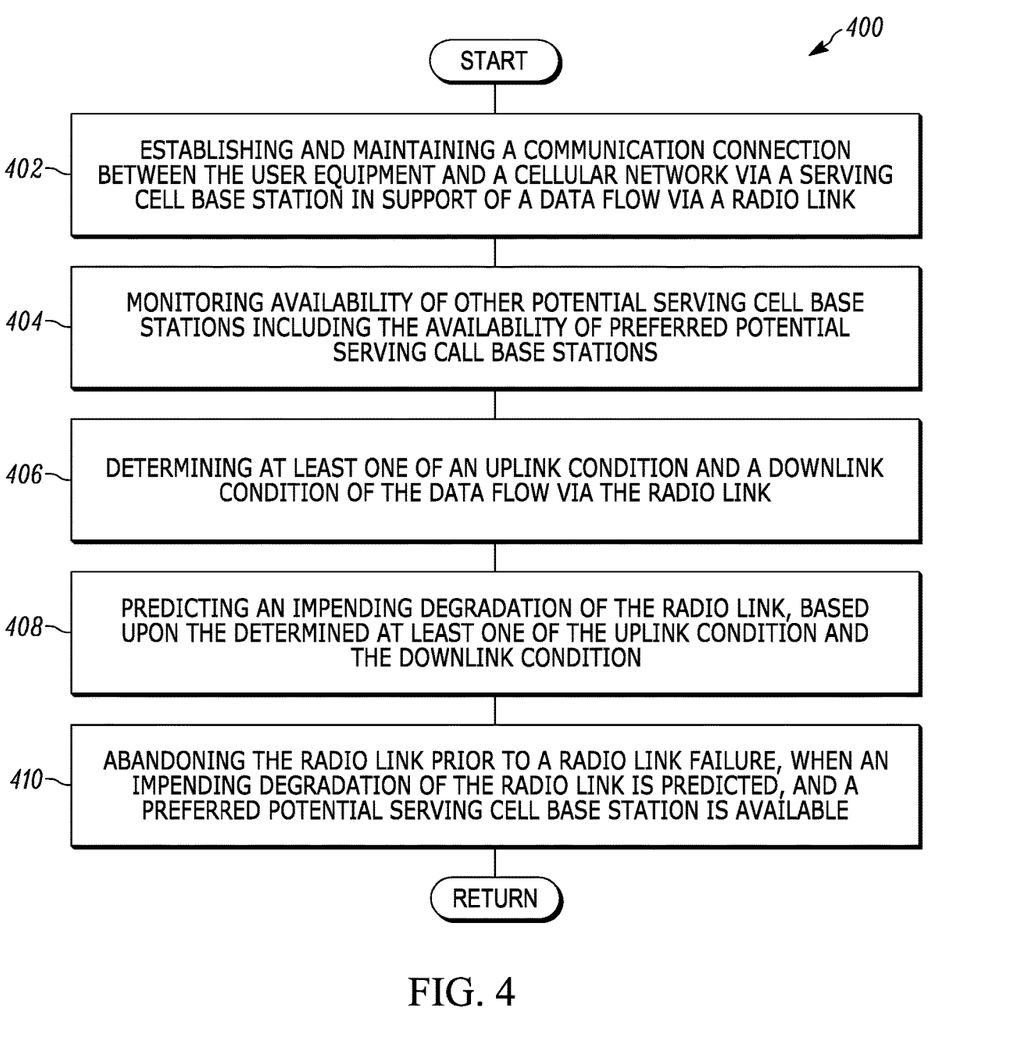
FIG. 4 is a flow diagram of a method for initiating a radio link abandonment in user equipment in advance of a radio link failure.

FIG. 4 illustrates a flow diagram 400 of a method for initiating a radio link abandonment in user equipment in advance of a radio link failure. The method includes establishing and maintaining 402 a communication connection between the user equipment and a cellular network via a serving cell base station in support of a data flow via a radio link. Availability of other potential serving cell base stations including the availability of preferred potential serving cell base stations is then monitored 404. At least one of an uplink condition and a downlink condition of the data flow via the radio link is then determined 406. Based upon the determined at least one of the uplink condition and the downlink condition, an impending degradation of the radio link is predicted 408. The radio link is then abandoned 410 prior to a radio link failure, when an impending degradation of the radio link is predicted, and a preferred potential serving cell base station is available.

Figure 5:
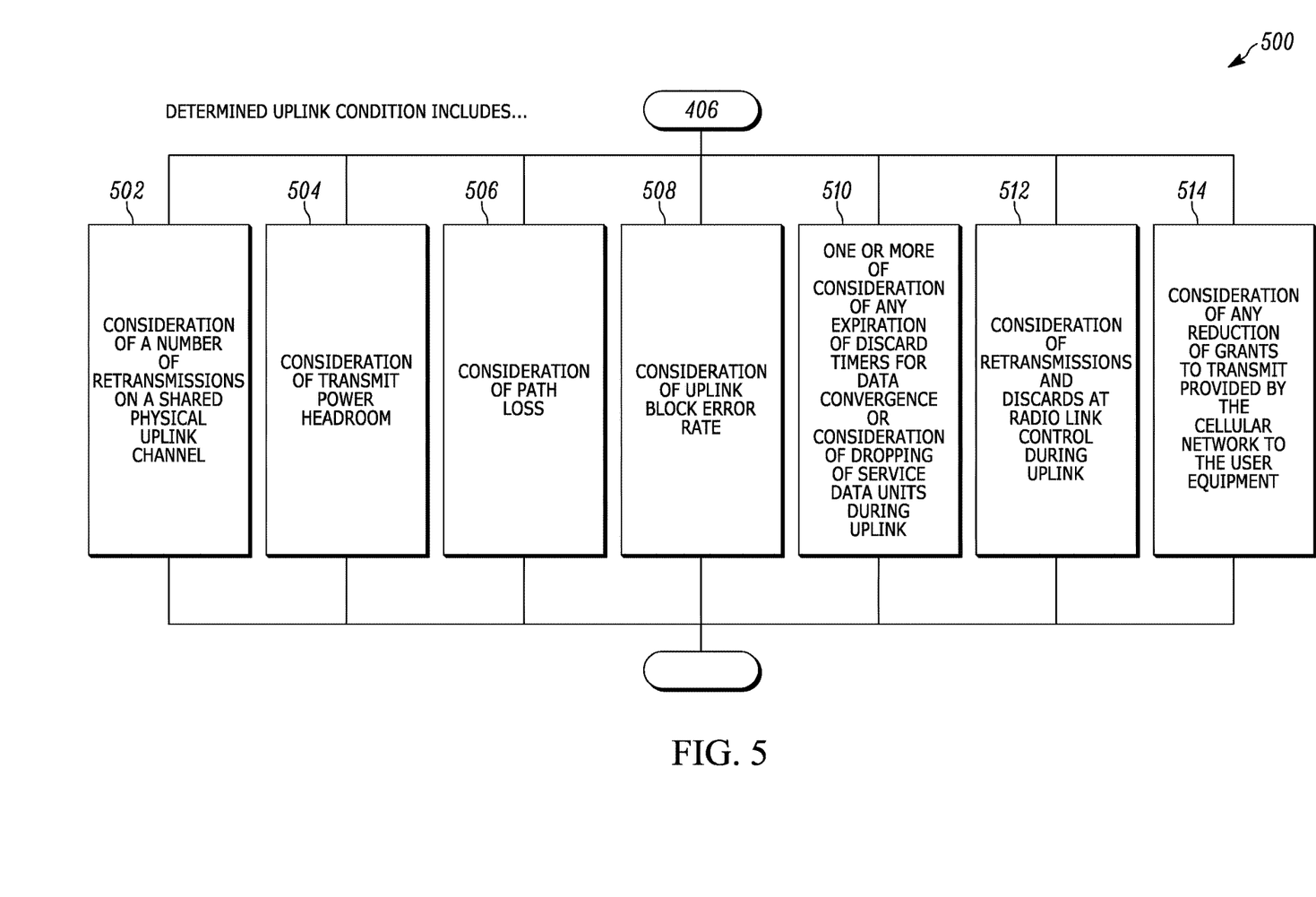
FIG. 5 is a more detailed flow diagram of determining an uplink condition of the communication connection.

FIG. 5 illustrates a more detailed flow diagram 500 of determining an uplink condition of the communication connection. In determining an uplink condition of the communication connection, one or more conditions may be detected and/or monitored. The one or more detected and/or monitored conditions relative to the uplink can include one or more of: a consideration of the number of retransmissions of a shared physical uplink channel 502; a consideration of the transmit power headroom 504; a consideration of path loss 506; a consideration of the uplink block error rate 508; one or more of a consideration of any expiration of discard timers for data convergence or consideration of dropping of service data units during uplink 510; consideration of retransmissions and discards at the radio link control during uplink 512; and/or a consideration of any reduction of grants to transmit provided by the network 110 to the wireless communication device 514.

Figure 6:
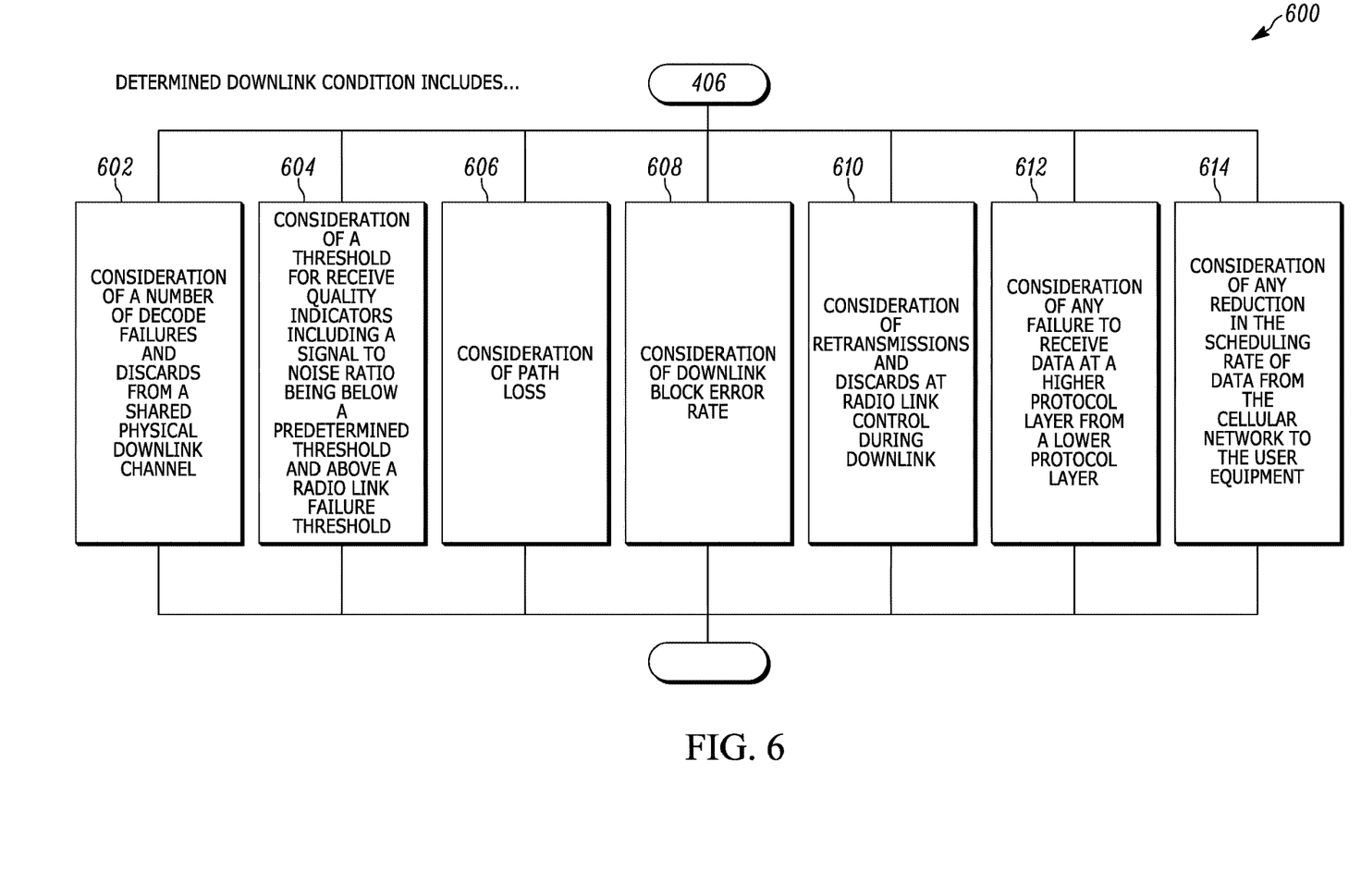
FIG. 6 is a more detailed flow diagram of determining a downlink condition of the communication connection.

FIG. 6 illustrates a more detailed flow diagram 600 of determining a downlink condition of the communication connection. In determining a downlink condition of the communication connection, one or more conditions may be detected and/or monitored. The one or more detected and/or monitored conditions relative to the downlink can include one or more of: a consideration of the number of decode failures and discards from a shared physical downlink channel 602; a consideration of a threshold for receive quality indicators including a signal to noise ratio being below a predetermined threshold and above a radio link failure threshold 604; a consideration of path loss 606; a consideration of downlink block error rate 608; a consideration of retransmissions and discards at radio link control during downlink 610; a consideration of any failure to receive data at a higher protocol layer from a lower protocol layer 612; and/or a consideration of any reduction in the scheduling rate of data from the network 110 to the wireless communication device 614.

By predicting a degradation of service, and as appropriate triggering an abandonment of the radio link, as opposed to waiting for a radio link failure, the period of time between t0 302 and t2 306, illustrated in FIG. 3 may be shortened. The determination of a degradation can involve one or more of the conditions noted, where in some instances it may only include a subset of detected conditions associated with one of the uplink or the downlink. In other instances, the degradation determination could include conditions associated with both the uplink and the downlink. In some instances, the corresponding conditions associated with the uplink may be considered before the corresponding conditions associated with the downlink are considered. For example, upon satisfaction of the corresponding subset of uplink conditions, it may be determined that no further transmissions are needed, and upon satisfaction of the corresponding subset of downlink conditions, it may be determined that there is no further need to keep a radio resource control connection.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method for initiating a radio link abandonment in user equipment in advance of a radio link failure, the method comprising:
    establishing and maintaining a communication connection between the user equipment and a cellular network via a serving cell base station in support of a data flow via a radio link;
    monitoring availability by the user equipment of other potential serving cell base stations including the availability of preferred potential serving cell base stations;
    determining in the user equipment at least one of an uplink condition and a downlink condition of the data flow via the radio link;
    based upon the determined at least one of the uplink condition and the downlink condition, predicting in the user equipment an impending degradation of the radio link; and
    abandoning the radio link by the user equipment prior to a radio link failure, when an impending degradation of the radio link is predicted, and a preferred potential serving cell base station is available; and
    wherein the determined downlink condition includes consideration of any failure to receive data at a higher protocol layer from a lower protocol layer.

2. A method in accordance with claim 1 further comprising after abandoning the radio link prior to a radio link failure, re-establishing and maintaining a communication connection between the user equipment and the cellular network via a new radio link associated with the preferred potential serving cell base station.

3. A method in accordance with claim 2, wherein upon abandoning the radio link, the user equipment stops receiving the data flow from the cellular network, and wherein upon reestablishing the communication connection via a new radio link, the user equipment resumes receiving a data flow from the cellular network.

4. A method in accordance with claim 1, wherein predicting the impending degradation of the radio link is based upon both a determined uplink condition and a determined downlink condition.

5. A method in accordance with claim 1, wherein the determined uplink condition includes consideration of a number of retransmissions on a shared physical uplink channel.

6. A method in accordance with claim 1, wherein the determined uplink condition includes consideration of transmit power headroom.

7. A method in accordance with claim 1, wherein the determined uplink condition includes consideration of path loss.

8. A method in accordance with claim 1, wherein the determined uplink condition includes consideration of uplink block error rate.

9. A method in accordance with claim 1, wherein the determined uplink condition includes one or more of consideration of any expiration of discard timers for data convergence or consideration of dropping of service data units during uplink.

10. A method in accordance with claim 1, wherein the determined uplink condition includes consideration of retransmissions and discards at radio link control during uplink.

11. A method in accordance with claim 1, wherein the determined uplink condition includes consideration of any reduction of grants to transmit provided by the cellular network to the user equipment.

12. A method in accordance with claim 1, wherein the determined downlink condition includes consideration of a number of decode failures and discards from a shared physical downlink channel.

13. A method in accordance with claim 1, wherein the determined downlink condition includes consideration of a threshold for receive quality indicators including a signal to noise ratio being below a predetermined threshold and above a radio link failure threshold.

14. A method in accordance with claim 1, wherein the determined downlink condition includes consideration of path loss.

15. A method in accordance with claim 1, wherein the determined downlink condition includes consideration of downlink block error rate.

16. A method in accordance with claim 1, wherein the determined downlink condition includes consideration of retransmissions and discards at radio link control during downlink.

17. A method in accordance with claim 1, wherein determining at least one of an uplink condition and a downlink condition of the data flow via the radio link is considered relative to a predetermined threshold.

18. A method for initiating a radio link abandonment in user equipment in advance of a radio link failure, the method comprising:
    establishing and maintaining a communication connection between the user equipment and a cellular network via a serving cell base station in support of a data flow via a radio link;
    monitoring availability by the user equipment of other potential serving cell base stations including the availability of preferred potential serving cell base stations;
    determining in the user equipment at least one of an uplink condition and a downlink condition of the data flow via the radio link;
    based upon the determined at least one of the uplink condition and the downlink condition, predicting in the user equipment an impending degradation of the radio link; and
    abandoning the radio link by the user equipment prior to a radio link failure, when an impending degradation of the radio link is predicted, and a preferred potential serving cell base station is available; and
    wherein the determined downlink condition includes consideration of any reduction in the scheduling rate of data from the cellular network to the user equipment.

19. A user equipment for use in a cellular network capable of initiating a radio link channel abandonment in advance of a radio link failure, the user equipment comprising:
    an antenna coupled to a transmitter and a receiver in support of establishing and maintaining a communication connection between the user equipment and a cellular network via a serving cell base station in support of a data flow via a radio link; and
    a controller further adapted for establishing and maintaining a communication connection, where the controller includes
        a base station availability module adapted for monitoring availability of other potential serving cell base stations including the availability of preferred potential serving cell base stations,
        a condition determination module adapted for determining at least one of an uplink condition and a downlink condition of the data flow via the radio link,
        a degradation prediction module adapted for predicting an impending degradation of the radio link, based upon the determined at least one of the uplink condition and the downlink condition, and
        a radio link abandonment module adapted for abandoning the radio link by the user equipment prior to a radio link failure, when an impending degradation of the radio link is predicted, and a preferred potential serving cell base station is available; and
    wherein the determined downlink condition includes consideration of any failure to receive data at a higher protocol layer from a lower protocol layer.

* * * * *